(No Model.)
F. M. PECK.
PRESERVING FOOD BY COLD, &c.
No. 515,789. Patented Mar. 6, 1894.
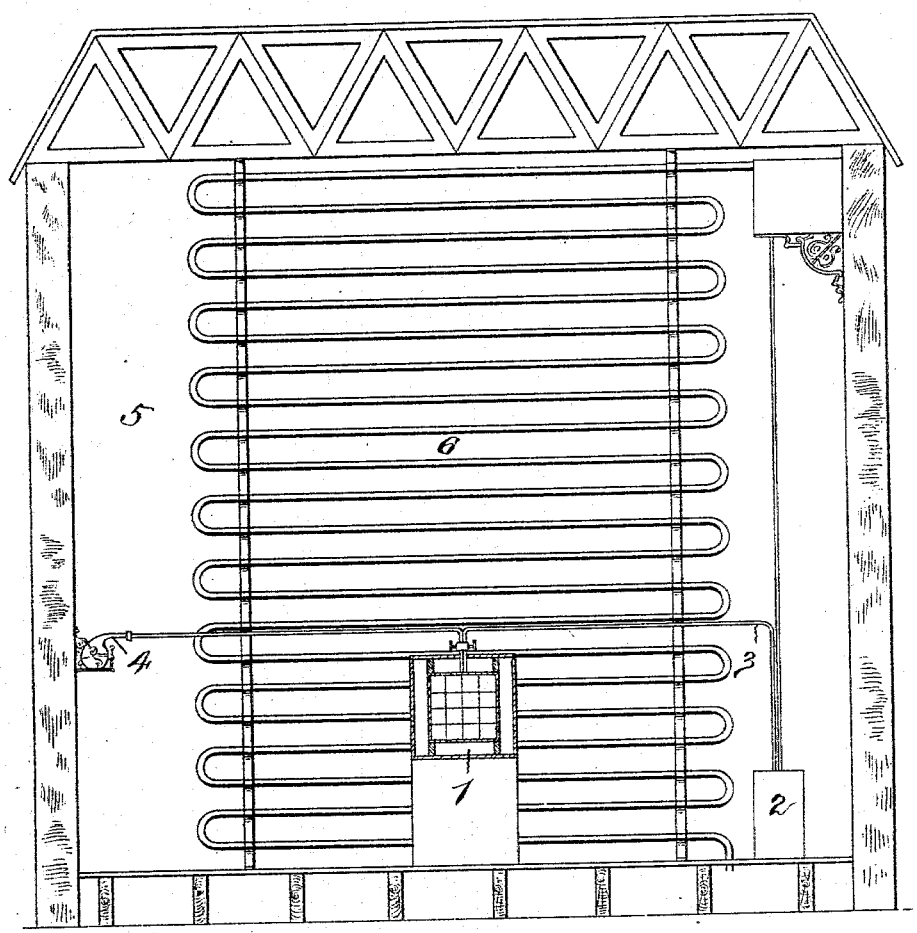

UNITED STATES PATENT OFFICE.

FREDERIC M. PECK, OF HARTFORD, CONNECTICUT.

PRESERVING FOOD BY COLD, &c.

SPECIFICATION forming part of Letters Patent No. 515,789, dated March 6, 1894.

Application filed January 31, 1893. Serial No. 460,381. (No model.)

*To all whom it may concern:*

Be it known that I, FREDERIC M. PECK, a citizen of the United States, residing at Hartford, in the county of Hartford and State of Connecticut, have invented certain new and useful Improvements in the Art of Preserving Perishable Foods, of which the following is a full, clear, and exact specification.

The invention relates to the art of keeping without change perishable foods, and it is more particularly intended and adapted to keep from disintegration, fermentation or any other deleterious change such uncooked food as butter, cheese, eggs, fruits, meats and the like.

The object of the invention is to provide a process by means of which food products may be kept in their natural and prime condition so as to retain their original flavors, this process being such that there can be no deterioration of quality in the goods, because their natural flavors are not abstracted, nor their juices extracted, also because they cannot be contaminated by contact with or by the absorption of injurious fluids, and the active germs in the substance are kept in an inert state. To properly accomplish this a low refrigeration, that is, a low temperature which almost but not quite freezes the juices of the goods, is necessary, and such low refrigeration cannot be obtained and continuously retained evenly by natural, that is, common ice packing processes; an artificial process by means of which the temperature can be absolutely and uniformly controlled is necessary. In order to preserve or retain the natural moisture, fluids and juices of the goods subjected to such low artificial refrigeration and prevent loss by evaporation, they must be placed in a permanently air tight receptacle, and to prevent any change in their condition, all matter which will effect a chemical change must be removed, or rendered inert, while to preserve the shape, outline and form of the goods after such matter has been removed an inert fluid which does not attack the substance of the goods should be substituted for the fluid removed.

In the practice of my invention, as illustrated in the accompanying drawing, which shows a diagram of an apparatus for carrying out the process, I first place the uncooked goods to be preserved in a receptacle, 1, which has air tight walls. This is usually a double walled box of the desired size. The interior of this box I prefer then to connect with a vacuum pump, 2, by means of a tube, 3, which pump, when operated will remove the unnecessary or deleterious fluids enveloping the goods, from the receptacle. The air tight receptacle containing the goods is placed in the chamber of a refrigerator or cold storage room, 5, provided with means for reducing and keeping the temperature evenly at the desired degree sufficiently low to keep the germs of the substance of the goods inert. The temperature is then dropped to the desired degree, and the pump operated. The fluids which are removed of course depend on the nature of the goods to be preserved, sometimes it is common air, sometimes oxygen and often only water. In some cases I introduce into the receptacle from a reservoir, 4, any desired fluid, such as a carbon gas or a solution of preservative salts, which will not chemically attack the substance to be kept, or act upon the food to change its nature. The degree of refrigerating temperature varies according to the nature of the goods to be preserved, but it is that just above the congealing point of the fluids in the goods, that is, the goods are retained evenly at a temperature at which the germs cannot act injuriously or the flavors and juices be extracted by the pump, but at which the goods will not freeze under the long continued low temperature to which they are then subjected. For instance, it is thought that butter is best kept at about 10° above zero, meats have been best kept at about 30°, while eggs are kept at about 34°. The degree of temperature of refrigeration involved in this process is that just above the congealing point of the fluids in the goods, that is, it is the well known degree of refrigeration of the goods and not any one fixed degree of temperature which is referred to in this application. Every line of goods will have its proper degree of temperature at which it is kept in accordance with this process of preserving, and any persons skilled in this art will readily determine the degree of temperature, according to the nature of the goods they have to operate upon, and this invention is not limited to any single degree of temperature. This refrigeration cannnot be produced by natural means, that is, in a refrigerator in which the temperature is reduced by ice, as ice does not retain the temperature sufficiently low and even to accomplish these objects.

The refrigerator shown is of a common kind having the usual temperature-reducing pipes, 6, in which the cooling chemicals are circulated. In refrigerators of this kind all the moisture in the chamber of the storage room collects on the surface of the cooling pipes and there congeals. Even if moisture is injected into the room it immediately congeals on the pipes, and if the goods are not protected, all their moisture, juices and flavors will be extracted by the same means, causing a shrinkage in volume as well as deterioration in quality of the goods.

By the practice of my process goods can be stored in a refrigerator, the temperature of which can be dropped to and kept uniformly at a degree necessary to render inert all active germs, vegetable and animal, and prevent chemical action which at ordinary temperatures will attack the goods and affect the quality, without abstracting from the goods by evaporation or the action of the pump any of their natural juices, changing their shape or form, or so exposing them that they will absorb and become tainted with deleterious or offensive fluids.

I claim as my invention—

The art of keeping uncooked perishable food products in their natural condition, which consists in placing the products in a receptacle, making the receptacle permanently air tight, placing this tight receptacle in a chamber provided with means for reducing its temperature, chilling the chamber with the inclosed tight receptacle, withdrawing the deleterious fluids from the chilled receptacle, and then maintaining the temperature of the chamber with the goods in the air tight receptacle just a few degrees above the congealing point of the fluids in the products to be kept, substantially as described and for the purpose specified.

FREDERIC M. PECK.

Witnesses:
H. R. WILLIAMS,
C. E. BUCKLAND.